US008516169B2

(12) United States Patent
Extra et al.

(10) Patent No.: US 8,516,169 B2
(45) Date of Patent: Aug. 20, 2013

(54) METHOD FOR TRANSMITTING TELEGRAMS BETWEEN A CONTROL DEVICE AND A PERIPHERAL ELEMENT VIA AN INTERMEDIATE DEVICE (75) Inventors: Johannes Extra, Erlangen (DE); Hermann Jartyn, Igensdorf (DE)

(73) Assignee: Siemens Aktiengesellschaft, München (DE)

( * ) Notice: Subject to any disclaimer, the term of this patent is extended or adjusted under 35 U.S.C. 154(b) by 311 days.

(21) Appl. No.: 12/228,410

(22) Filed: Aug. 12, 2008

(65) Prior Publication Data
US 2009/0055558 A1 Feb. 26, 2009

(30) Foreign Application Priority Data
Aug. 13, 2007 (EP) .................................... 07015896

(51) Int. Cl.
G06F 3/00 (2006.01)
G06F 13/00 (2006.01)
G06F 5/00 (2006.01)
G06F 13/28 (2006.01)
H04L 12/66 (2006.01)
H04L 12/50 (2006.01)

(52) U.S. Cl.
USPC .......... 710/52; 710/2; 710/5; 710/29; 710/31; 710/316; 711/113; 711/153; 370/352; 370/382; 370/383

(58) Field of Classification Search
USPC ....... 710/31, 52, 316, 2, 29, 5; 711/113–114, 711/153; 700/3, 79; 713/400; 370/352, 370/382, 383
See application file for complete search history.

(56) References Cited

U.S. PATENT DOCUMENTS

| 4,074,352 | A | * | 2/1978 | Cook et al. ......................... 710/2 |
| 4,130,883 | A | * | 12/1978 | Hazelton .......................... 710/71 |
| 4,796,025 | A | * | 1/1989 | Farley et al. .................. 340/3.51 |
| 5,297,142 | A | * | 3/1994 | Paggeot et al. ................ 370/461 |
| 5,659,718 | A | * | 8/1997 | Osman et al. .................. 713/400 |
| 5,975,736 | A | * | 11/1999 | Simmons et al. .................. 700/3 |
| 6,154,794 | A | * | 11/2000 | Abdalla et al. .................. 710/29 |
| 6,385,681 | B1 | * | 5/2002 | Fujimoto et al. .............. 710/316 |

(Continued)

FOREIGN PATENT DOCUMENTS

| DE | 199 28 517 A1 | 1/2001 |
| DE | 100 04 425 A1 | 1/2002 |

(Continued)

OTHER PUBLICATIONS

Switch (Computertechnik) aus Wikipedia, der freien Enzyklopädie, Seiten 1-10, gefunden am Jul. 24, 2012, de.wikipedia.org/wiki/Switch_(Computertechnik); Others; 2012.

Primary Examiner — Idriss N Alrobaye
Assistant Examiner — Henry Yu (57) ABSTRACT For the transmission of a telegram from the control device to the peripheral element an intermediate device receives the telegram from the control device and forwards it without amendment to the peripheral element. For the transmission of a telegram from the peripheral element to the control device the intermediate device receives the telegram from the peripheral element and forwards it without amendment to the control device. The telegrams are safety telegrams, so that telegrams forwarded to the control device or to the peripheral element from the respective receiving unit can be checked for freedom from errors.

12 Claims, 6 Drawing Sheets

(56) References Cited

U.S. PATENT DOCUMENTS

| | | | |
|---|---|---|---|
| 6,412,032 B1 * | 6/2002 | Neet et al. | 710/52 |
| 6,604,161 B1 * | 8/2003 | Miller | 710/260 |
| 6,684,295 B2 * | 1/2004 | Fujimoto et al. | 711/113 |
| 7,139,882 B2 * | 11/2006 | Suzuoki et al. | 711/153 |
| 7,486,999 B2 * | 2/2009 | Glanzer et al. | 700/79 |
| 8,031,169 B2 * | 10/2011 | Hoerl | 345/156 |
| 8,041,840 B2 * | 10/2011 | Batke et al. | 709/250 |
| 2002/0095551 A1 * | 7/2002 | Fujimoto et al. | 711/114 |
| 2005/0210722 A1 * | 9/2005 | Graef et al. | 40/452 |
| 2006/0253619 A1 * | 11/2006 | Torudbakken et al. | 710/31 |

FOREIGN PATENT DOCUMENTS

| | | |
|---|---|---|
| EP | 1 596 262 A1 | 11/2005 |
| JP | 2006-164143 A | 6/2006 |
| WO | WO 03/028306 A1 | 4/2003 |
| WO | WO 03/096637 A2 | 11/2003 |
| WO | WO 2005/003869 A1 | 1/2005 |
| WO | WO 2005/101145 A1 | 10/2005 |
| WO | WO 2006/029899 A1 | 3/2006 |

\* cited by examiner

METHOD FOR TRANSMITTING TELEGRAMS BETWEEN A CONTROL DEVICE AND A PERIPHERAL ELEMENT VIA AN INTERMEDIATE DEVICE

CROSS REFERENCE TO RELATED APPLICATIONS

This application claims priority of European application No. 07015896.9 filed Aug. 13, 2007, which is incorporated by reference herein in its entirety.

FIELD OF THE INVENTION

The present invention relates to a method for transmitting telegrams between a control device and a peripheral element.

BACKGROUND OF THE INVENTION

In automation technology, the safe control of machines and equipment is imperative. In particular safety-oriented information must be reliably transmitted between the control device and the peripheral element. Furthermore, safe processing must be guaranteed. In this case the expression "safe processing" means that a single error must have no dangerous consequences. The expression "reliable transmission" means that transmission errors can be excluded with reasonable certainty. As an example of safe processing, two control devices monitor one another and arrive at a safe state in a controlled system as soon as one of the two control devices detects an error state. A further example of safe processing is when a control device considered to be unreliable per se and a peripheral element considered to be unreliable per se are monitoring one another and bring about a suitable safety reaction in the event of an error being detected.

Reliable transmission requires on the one hand that errors in telegrams from the respective receiving unit can be detected. It requires furthermore that above and beyond telegram errors as such, the sequence and non-arrival of telegrams can also be reliably detected.

It is known from the prior art that data can be transmitted between the control device and the peripheral element over separate lines. It is further known that the telegrams can be transmitted over a bus from the control device to the peripheral element or vice versa. In this case, in the prior art the control device and the peripheral element are on the one hand connected to the bus. On the other, the telegrams are safety telegrams, so that telegrams transmitted to the control device can be checked for freedom from errors by said control device, and telegrams transmitted to the peripheral element can be checked for freedom from errors by said peripheral element.

Automation tasks are often carried out by hierarchically structured automation systems. If in such a case further components (=intermediate device within the meaning of the present invention) are arranged between the control device and the peripheral element, as a rule the information relating to safety is transmitted over dedicated lines via which the respective peripheral element is connected to the control device.

Document DE 199 28 517 A1 discloses a control system that has a first reliable control device, a second, unreliable control device and peripheral devices. The reliable control device is arranged between the unreliable control device and the peripheral devices. The reliable control device is in a position to receive telegrams from the second, unreliable control device and to forward said telegrams either amended or without amendment to the peripheral devices. The reliable control device is furthermore in a position to forward telegrams received from the peripheral devices without amendment to the second, unreliable control device and at the same time to monitor said telegrams.

Document WO 2006/029899 A discloses a method for transmitting telegrams between a control device and a peripheral element.

SUMMARY OF THE INVENTION

The object of the present invention is to create options whereby safety-oriented telegrams can be transmitted via the intermediate device, even though the intermediate device performs further tasks, in particular time-critical tasks.

This object is achieved by the claims.

According to the invention, in a method for the transmission of telegrams between a control device and a peripheral element for transmitting one of the telegrams from the control device to the peripheral element, an intermediate device receives the respective telegram from the control device, buffers it, and at the latest after a maximum buffer time forwards it without amendment to the peripheral element. A like method applies to the transmission of one of the telegrams from the peripheral element to the control device. Here also the intermediate device receives the respective telegram, buffers it, and at the latest after a maximum buffer time forwards it without amendment. The telegrams are safety telegrams, so that the telegrams from the respective receiving unit (control device or peripheral element) can be checked for freedom from errors. In this case, the check for freedom from errors includes on the one hand internal freedom from errors in the respective telegrams and on the other hand both the correct sequence and the non-arrival of telegrams.

The intermediate device receives and forwards telegrams in the context of a switching functionality. In addition to the switching functionality, the intermediate device has its own dedicated functionality. Said intermediate device is designed so that a write access to the buffer (in which the received telegrams are temporarily stored) is locked out in the context of the dedicated functionality. This applies even when, in the context of said dedicated functionality, an attempt is made to amend telegrams. This method makes it impossible for telegrams to be corrupted by the dedicated functionality.

Preferably the intermediate device receives the respective telegram over a logical input channel, determines a logical output channel corresponding to the logical input channel, and forwards the respective telegram over said logical output channel. This method has the advantage that the intermediate device can handle the communication in a particularly simple manner.

Preferably the intermediate device determines the logical output channel by means of an internal configuration. This is a particularly flexible method.

As a rule the telegrams exchanged between the control device and the peripheral element refer to one safety function each. Preferably each safety function is individually assigned to one logical input channel and one corresponding logical output channel per direction of transmission. By this method the individual safety functions can be handled separately from one another.

Unlike a write access, a read access to the buffer is not critical. The intermediate device can therefore be designed so that a read access to the buffer is possible in the context of the dedicated functionality. In particular, safety-related information exchanged between the control device and the peripheral device can thereby be taken into account in the context of the dedicated functionality.

The admissibility of access to the buffer in the context of the dedicated functionality is preferably determined by an internal configuration of the intermediate device, definable independently of the dedicated functionality of said intermediate device. In this way it is a simple matter to ensure that the buffer is closed to a write access but open (if necessary only partly) to a read access.

It is possible for the intermediate device to have a program memory in which a program is stored, said program being executable by a corresponding device in the intermediate device and the execution of said program bringing about the inventive operation of the intermediate device. Alternatively the intermediate device can have an ASIC for this purpose.

BRIEF DESCRIPTION OF THE DRAWINGS

Further features and advantages of the invention will emerge from the description which follows of exemplary embodiments and from the accompanying drawings. These are schematic diagrams which show the following.

DETAILED DESCRIPTION OF THE INVENTION

Figure 1:
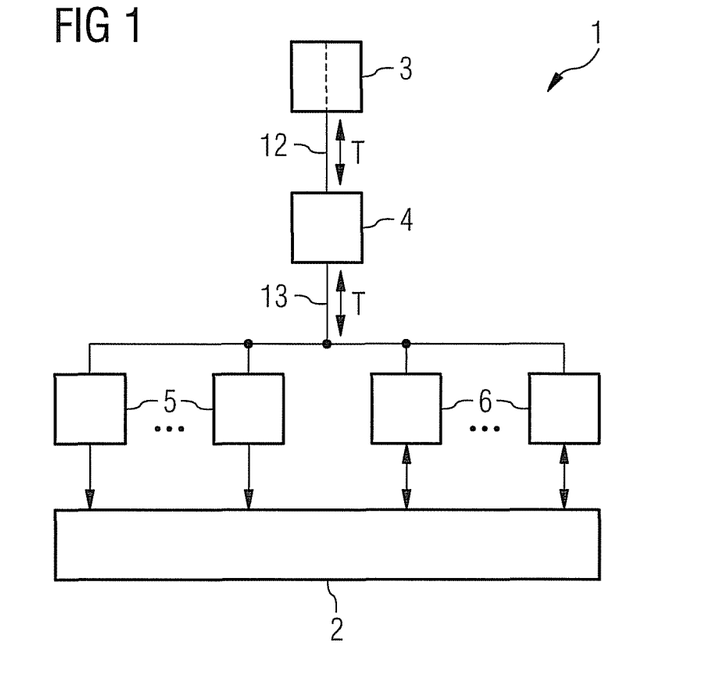
FIG. 1 A schematic diagram showing the structure of an automation system.

In FIG. 1 it is intended that an automation system 1 shall control a technical process 2. The automation system 1 is structured hierarchically for this purpose. It consists of (at least) one higher-ranking control device 3, (at least) one middle-ranking intermediate device 4 and lower-ranking peripheral elements 5, 6. The peripheral elements 5, 6 can be drives 5 and input/output elements 6, for example.

The higher-ranking control device 3 can be embodied in the form of a safety-oriented control device 3. This is shown in FIG. 1, which indicates by a broken line that the control device 3 is divided into two sub-devices. As a rule the intermediate device 4 does not control safety-oriented functions of the peripheral elements 5, 6. In particular (assuming a corresponding embodiment of the technical process 2) the intermediate device 4 can control the movement of a numerically controlled machine, or control movement in general, or more generally still, control a process. The intermediate device 4 can be embodied in the form of a safety-oriented intermediate device 4. As a rule, however, it is not embodied in the form of a safety-oriented intermediate device 4. The peripheral elements 5, 6 can be embodied partly in the form of safety-oriented peripheral elements 5, 6 and partly in the form of non-safety-oriented peripheral elements 5, 6.

Non-safety-oriented functions are not relevant to the context of the present invention. From this point on, therefore, only safety-oriented functions (=safety functions) will be discussed. Each safety function is assigned to a specific peripheral element 5, 6. It is possible for more than one safety function to be assigned to an individual peripheral element 5, 6.

For the purpose of implementing safety functions, the control device 3 and the respective peripheral element 5, 6 exchange telegrams T. Each telegram T is concerned with one (1) safety function in each case.

Figure 2:
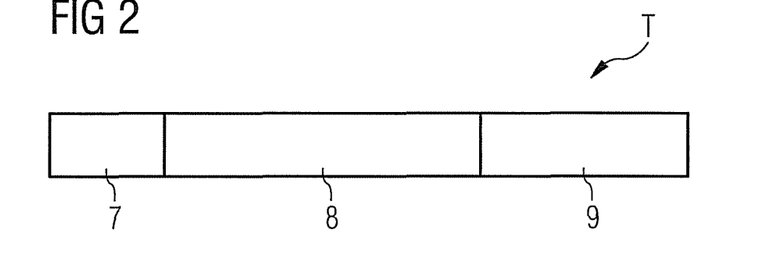
FIG. 2 A schematic diagram showing the structure of telegrams.

The telegrams T are safety-oriented (=safety telegrams). As FIG. 2 shows, they consist of a header 7, payload data 8 and safety information 9. The header 7 contains for example information about the transmitting unit (control device 3 or peripheral element 5, 6), the receiving unit (peripheral element 5, 6 or control device 3) and further data as necessary. Included in the payload data 8 is for example information about the respective safety function as such, its state (active or inactive) and further parameters as necessary. The safety information 9 includes for example information about the time at which the respective safety telegram T was generated together with test information such as a CRC and the like. The telegrams T are defined by appropriate standards. An example of a relevant standard is known as the PROFISAFE standard.

Figure 3:
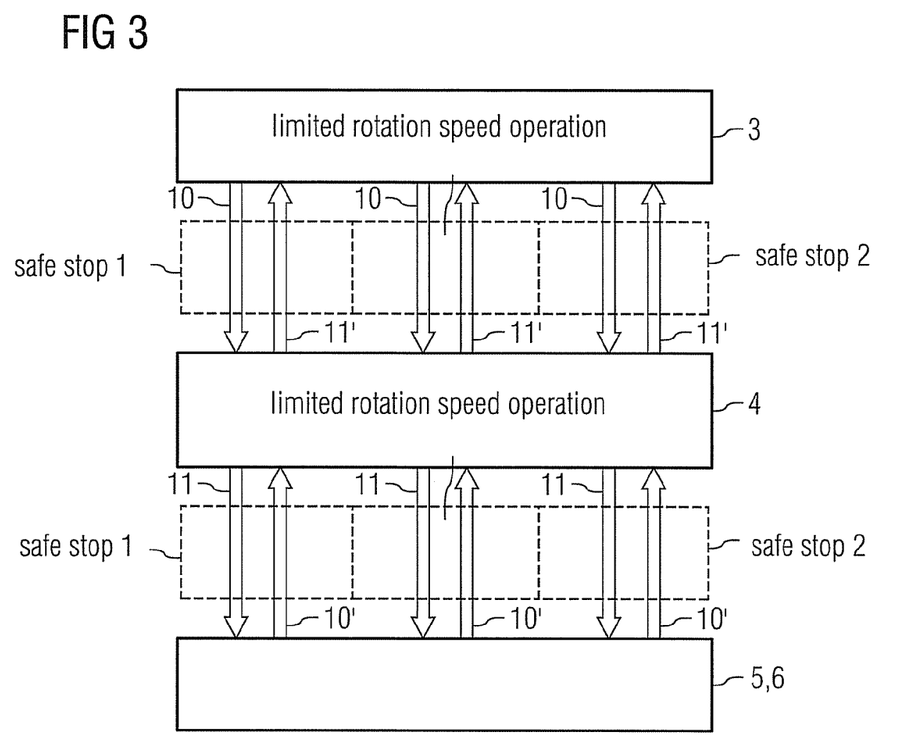
FIG. 3 A communication structure between a control device and a peripheral element, FIG. 4 A schematic diagram showing the structure of an intermediate device, FIGS. 5 and 6 Flowcharts, FIG. 7 The structure of a configuration, and FIG. 8 A flow chart.

As shown in FIG. 3, examples of safety-oriented functions for a drive 5 are for example the so-called safe stop 1 (that is, rotation speed=zero, after disconnection from the power source), the safe stop 2 (that is, rotation speed=zero together with active stop of the drive 5 on rotation speed zero) or limited rotation speed operation (that is, rotation speed less than a limiting rotation speed, it being possible to assign a parameter to said limiting rotation speed). The respective parameters (activation or deactivation and if necessary parameter assignment in respect of the safety function concerned) are provided by the control device 3. The drive 5 concerned sends back to the control device 3 information such as its rotation speed and the status of its current supply.

In FIG. 3, a logical input channel 10 and a corresponding logical output channel 11 in the intermediate device 4 are available to each safety function for the purpose of transmitting the respective telegrams T referring to the safety function concerned from the control device 3 to the respective peripheral element 5, 6. Likewise, corresponding logical input and output channels 10', 11' are also available for the corresponding transmission of telegrams T from the peripheral element 5, 6 concerned to the control device 3.

As already mentioned, the transmitted telegrams T are safety telegrams. The receiving unit in each case (the control device 3 or the respective peripheral element 5, 6, depending on the transmission direction) is therefore in a position to check the received telegram T for freedom from errors. The check includes on the one hand internal freedom from errors in the respective telegram T as such, and on the other hand the timeliness or lateness and the correct sequence or the non-arrival of the telegram T. If the respective unit 3, 5, 6 detects an error (of whatever kind), it triggers a safety-oriented reaction. A drive 5 can automatically bring about safe stop 1, for example. The control device 3 can for instance activate protections which cause the current supply to the drive 5 and the other peripheral elements 6 to be disconnected.

Inventively, communication between the control device 3 and the peripheral elements 5, 6 is not direct, but via the intermediate device 4 instead. The intermediate device 4 therefore receives the respective telegram T from the respective transmitting unit (control device 3 or peripheral element 5, 6). It forwards the appropriate telegram T without amendment to the recipient unit (peripheral element 5, 6 or control device 3). In these circumstances forwarding is carried out without amendment. Thus the telegram T remains in its original form.

Communication between on the one hand the control device 3 and the intermediate device 4, and between the intermediate device 4 and the peripheral elements 5, 6 on the other, can be via the buses 12, 13 for example. In this case the buses 12, 13 can be different from one another, as shown in FIG. 1. Alternatively they can be physically the same type of bus. The deciding factor is the logical arrangement of the intermediate device 4 between the control device 3 and the peripheral elements 5, 6.

Figure 4:
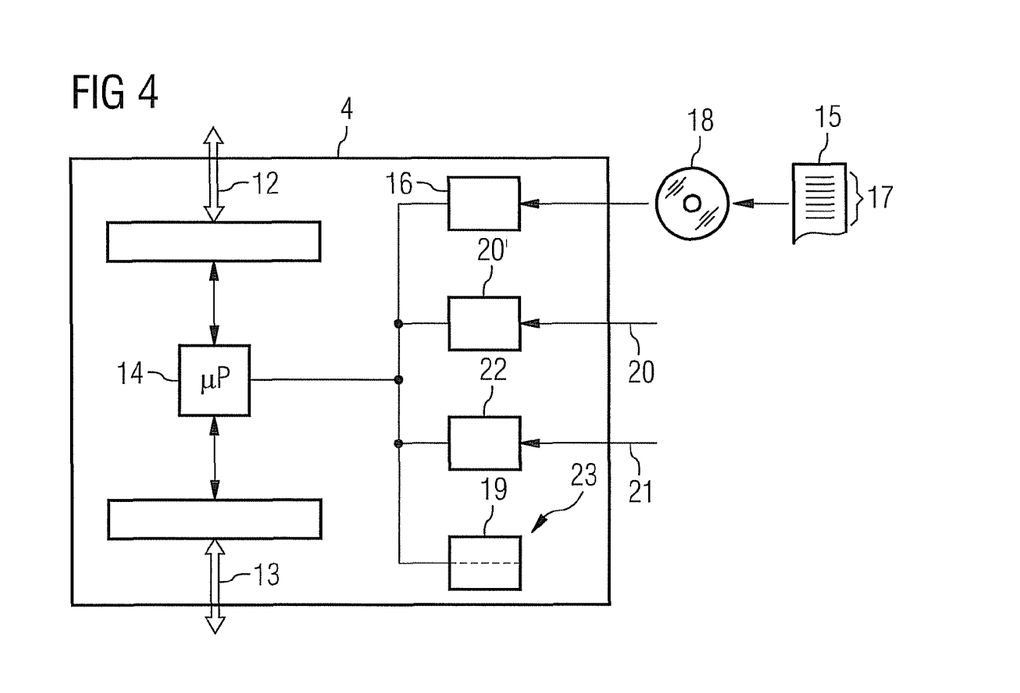

In FIG. 4, the intermediate device 4 is embodied as a rule in the form of an intermediate device 4 controlled by a microprocessor 14 (or some other suitable device). It therefore has a microprocessor 14 which executes a program 15 when operating. The program 15 is stored in a program memory 16 of the intermediate device 4.

The program 15 includes machine code 17 which can be executed by the microprocessor 14 of the intermediate device 4. When the microprocessor 14 of the intermediate device 4 processes the machine code 17, it causes the intermediate device 4 to execute a method which is described in detail below.

The program 15 can be fed to the intermediate device 4 via the Internet or some other computer network, for example. Alternatively the program 15 can be fed to the intermediate device 4 by means of a suitable data medium 18 on which the program 15 is stored in machine readable form. Examples of suitable data media 18 are a CD-ROM, a USB-memory stick, a memory card etc.

Figure 5:
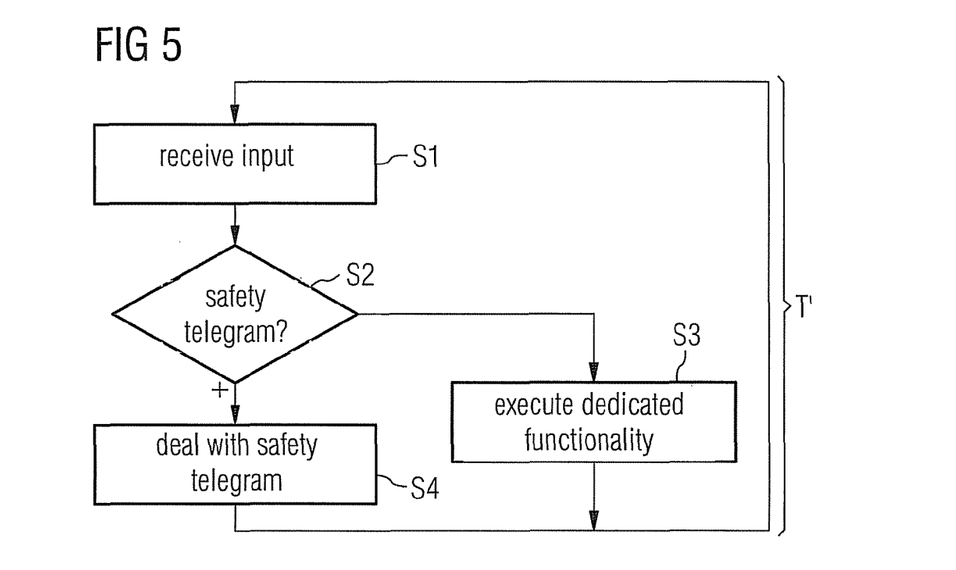

In FIG. 5 the intermediate device 4 receives input in a step S1. The received input can alternatively be a safety telegram T or some other kind of input.

In a step S2 the intermediate device 4 checks whether the input from step S1 is a safety telegram T. If the input is not a safety telegram T, the intermediate device 4 goes on to a step S3 in which it executes a dedicated functionality. In the case of a conventional embodiment of the intermediate device 4 in the form of a controller for the technical process 2, and in the context of step S3, the intermediate device 4 can process for example a control program for the technical process 2. Step 3 will be explained in greater detail later by reference to FIG. 8. On the other hand, if the input from step S1 is a safety telegram T, the intermediate device 4 executes a step S4. The safety telegram T is further processed in step S4. Step S4 will be explained in greater detail by reference to FIG. 6.

Figure 6:
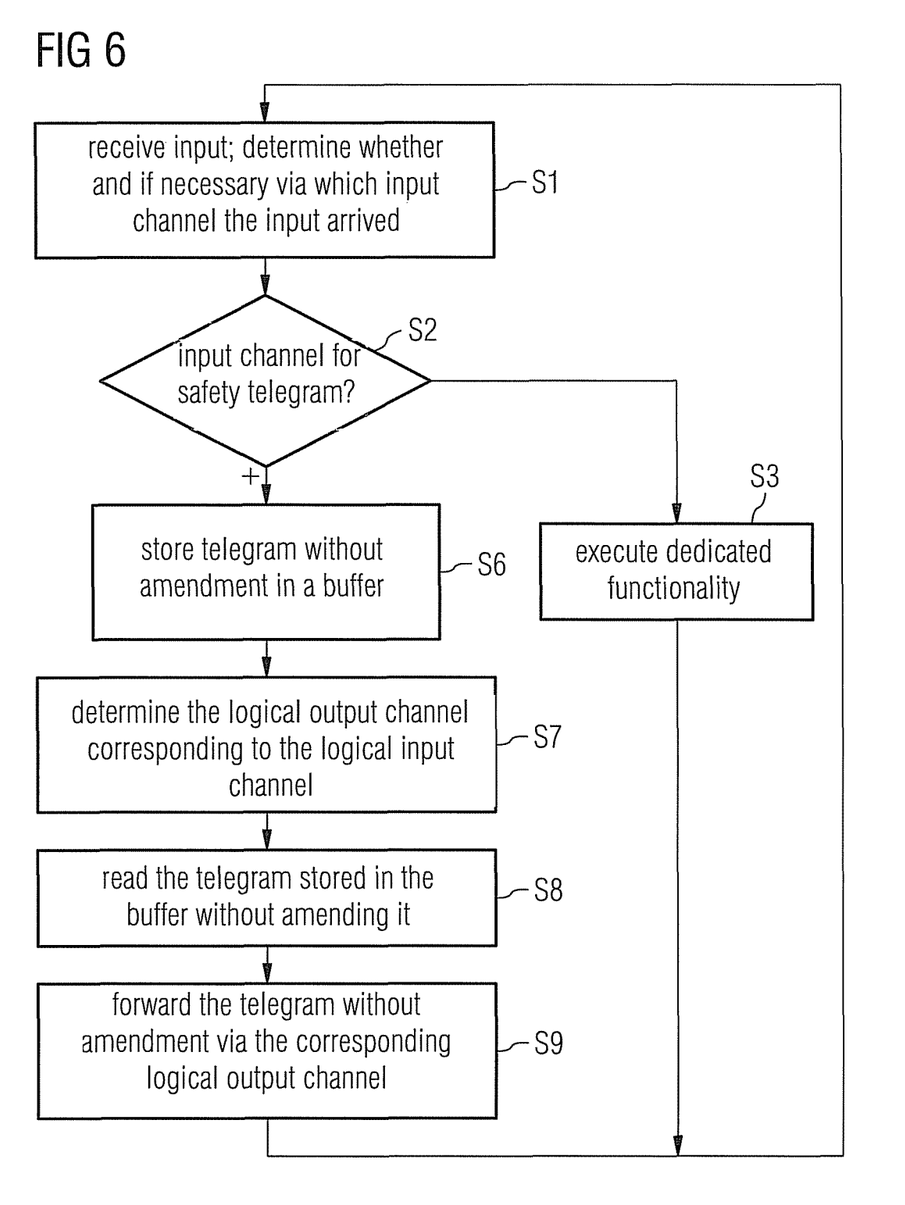

According to FIG. 6, the intermediate device 4 receives the input concerned in the context of step S1. Furthermore, in the context of said step S1 it determines whether and if necessary via which input channel 10, 10' the input arrived. In step S2 the intermediate device 4 uses the information to decide whether for example the input arrived via one of the input channels 10, 10' and whether said input from step S1 is a safety telegram T. Step S4 in FIG. 5 is performed in FIG. 6 by steps S6 through S9.

In step S6 the intermediate device 4 stores the received telegram T in a buffer 19. No amendments are made to the telegram T when it is stored in the buffer 19. Said telegram T stays in fact unchanged.

Figure 7:
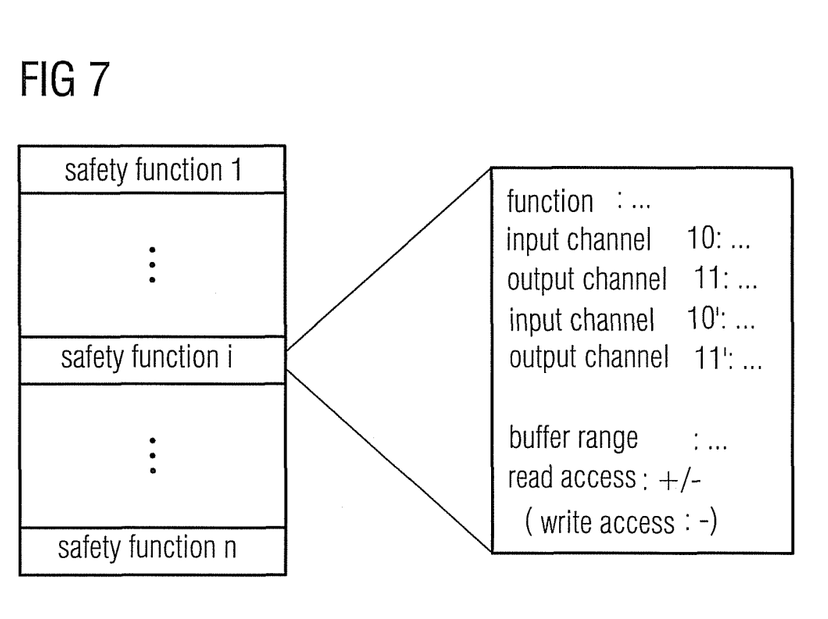

In step S7 the intermediate device 4 determines the logical output channel 11, 11' corresponding to the logical input channel 10, 10' over which the telegram T concerned was received. For this purpose a configuration 20, for example, can be specified for the intermediate device 4 (cf. FIGS. 4 and 7) and stored in a configuration memory 20'. In this case, for each safety function per transmission direction, the configuration 20 contains the input channel 10, 10' assigned in each case, the output channel 11, 11' assigned in each case, and a memory range of the buffer 19 in which the respective telegram T is buffered. Moreover the method can determine whether or not the content of the memory range in the buffer 19 has to be read for the respective safety function. This will be discussed in greater detail later. If the intermediate element 4 also has other configurations, these other configurations are preferably stored separately.

In step S8 the intermediate device 4 reads the telegram T stored in the buffer 19 and forwards it in step S9 via the corresponding logical output channel 11, 11'. The telegram T is read from the buffer 19 and then forwarded, without amendment in both cases.

Steps S1, S2 and S4 of FIG. 5 are processed within a cycle time T'. This ensures that the intermediate device 4 forwards received telegrams T at the latest after a maximum buffer time (being the cycle time T').

Figure 8:
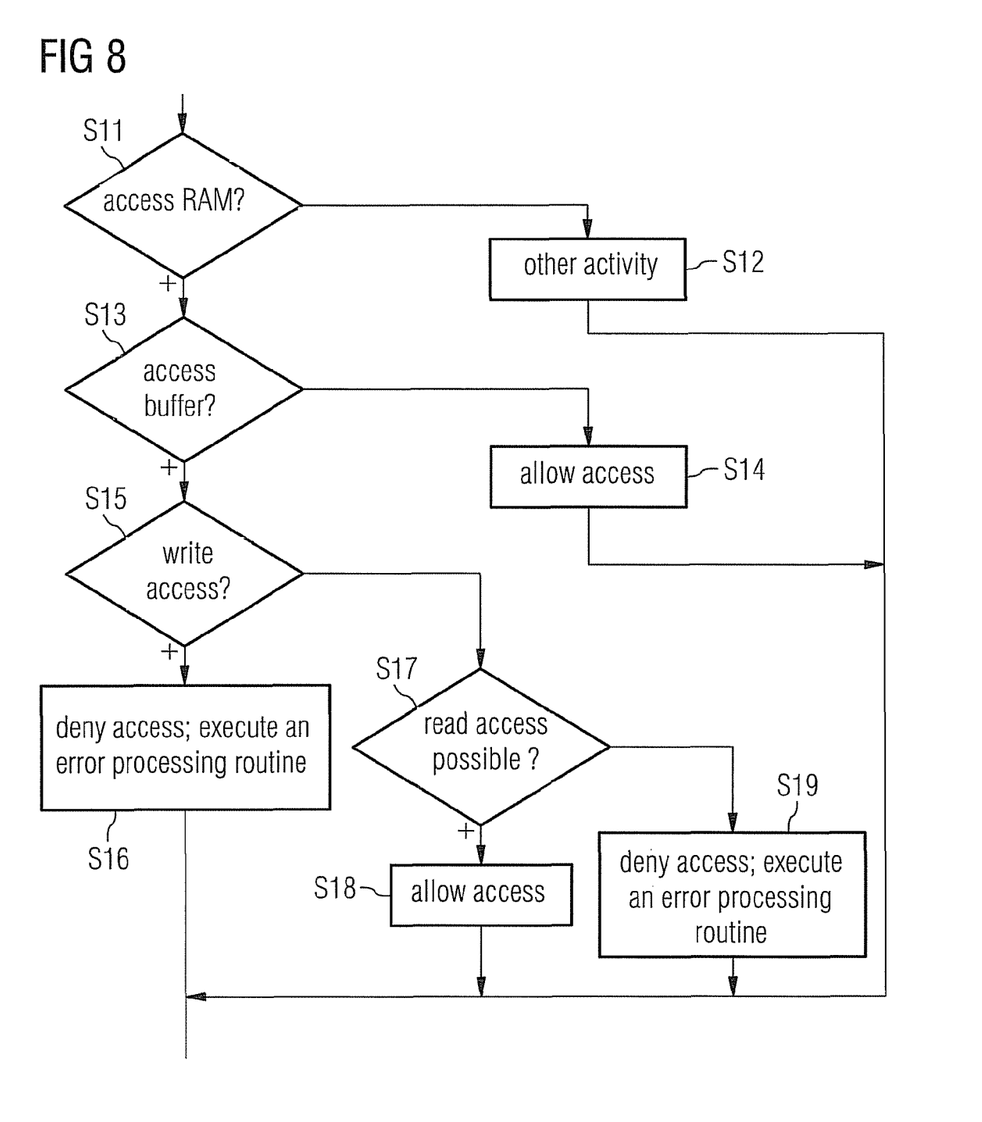

The procedure explained above in conjunction with FIG. 6 corresponds to a switching functionality which the intermediate device 4 executes. The dedicated functionality of step S3 is independent of this switching functionality. As a rule the dedicated functionality is determined by a user program 21 held in a user memory 22 of the intermediate device 4. The user program 21 and the internal configuration 20 can be specified for the intermediate device 4 independently of one another. Preferably a system program to be explained in greater detail below by reference to FIG. 8 is subordinate to the dedicated functionality (=step S3 of FIG. 5). Said system program can be a component of the program 15.

As shown in FIG. 8, the intermediate device 4 checks in a step S11 whether there is a need to access a random access memory (or RAM) 23. If this is not the case, the intermediate device 4 executes in a step S12 some other activity that does not include this kind of memory access. The RAM 23 includes among other things the buffer 19.

If there is a need to access the RAM 23, the intermediate device 4 checks in a step S13 whether there is a need to access the buffer 19. If this is not the case, that is, there is a need to access the RAM 23 but not the buffer 19, the intermediate device 4 permits said access in a step S14.

If there is a need to access the buffer 19, the intermediate device 4 checks in a step S15 whether the desired access is a write access. If this is the case, the intermediate device 4 denies access in a step S16 and executes an error processing routine. Otherwise said intermediate device goes to a step S17.

In step S17 the intermediate device 4 checks whether a read access to the buffer 19 is possible (=permissible). The intermediate device 4 can perform the check in step S17 on the basis of the configuration 20, for example (cf. FIG. 7). If the read access is permissible, the intermediate device 4 permits the read access in a step S18. Otherwise the intermediate device 4 denies the read access in a step S19 and executes an error processing routine. Step S19 is the same in all major respects as step S16.

The above described embodiment of the intermediate device 4 in which said intermediate device 4 is embodied in the form of a software-programmable device. Alternatively the intermediate device 4 could have an ASIC for the purpose of executing the inventive method.

The inventive method has many advantages. In particular there is no need to install lines between the control device 3 and the peripheral elements 5, 6. The present invention is therefore simple to produce. Moreover the inventive method is highly reliable and can also be retrofitted very simply to existing automation systems 1. Furthermore the safety functions can be configured independently of the user program 21. Thus alterations to the safety functions and their configuration 20 have no effect on the user program 21.

The sole purpose of the above description is to explain the present invention. The extent of protection for the present invention, however, shall be defined solely by the accompanying claims.

The invention claimed is:

1. A method for transmitting telegrams between a control device and a peripheral element, comprising:
   providing an automation system controlling a technical process and comprising peripheral elements including drives and input/output elements,
   receiving the telegrams by an intermediate device in a context of a switching functionality, wherein the intermediate device controls a movement of a numerically controlled machine and comprises a microprocessor, a program memory and a buffer;
   temporarily storing the telegrams in the buffer of the intermediate device;
   forwarding the telegrams at latest after a maximum buffer time without amendment between the control device and the peripheral element in the context of the switching functionality by the intermediate device;
   checking the telegrams for freedom from errors by the control device and the peripheral element; and
   locking out a write access to the buffer by the intermediate device so that the telegrams remain in original forms without amendments.

2. The method as claimed in claim 1, wherein the intermediate device receives the telegrams over a logical input channel and determines a logical output channel corresponding to the logical input channel and forwards the telegram over the logical output channel.

3. The method as claimed in claim 2, wherein the intermediate device determines the logical output channel by an internal configuration.

4. The method as claimed in claim 2, wherein the telegrams transmitted between the control device and the peripheral element refer to a safety function that is assigned to the logical input channel and the corresponding logical output channel per a direction of the transmission.

5. The method as claimed in claim 1, wherein a read access to the buffer is permissible in the context of the dedicated functionality by the intermediate device.

6. The method as claimed in claim 5, wherein an admissibility of the read access to the buffer in the context of the dedicated functionality is determined by an internal configuration of the intermediate device that is defined independently of the dedicated functionality of the intermediate device.

7. The method as claimed in claim 1, wherein an admissibility of the write access to the buffer in the context of the dedicated functionality is determined by an internal configuration of the intermediate device that is defined independently of the dedicated functionality of the intermediate device.

8. The method as claimed in claim 1, wherein the intermediate device receives the telegrams from the control device in the context of the switching functionality and forwards the telegrams to the peripheral element at latest after the maximum buffer time without amendment in the context of the switching functionality.

9. The method as claimed in claim 1, wherein the intermediate device receives the telegrams from the peripheral element in the context of the switching functionality and forwards the telegrams to the control device at latest after the maximum buffer time without amendment in the context of the switching functionality.

10. A non-transitory computer readable storage medium storing a computer program executed on an intermediate device for transmitting telegrams between a control device and a peripheral element, the computer program comprising:
    providing an automation system controlling a technical process and comprising peripheral elements including drives and input/output elements,
    receiving the telegrams by an intermediate device in a context of a switching functionality, wherein the intermediate device controls a movement of a numerically controlled machine and comprises a microprocessor, a program memory and a buffer;
    temporarily storing the telegrams in a buffer of the intermediate device,
    checking the telegrams for freedom from errors by the control device and the peripheral element,
    forwarding the telegrams at latest after a maximum buffer time without amendment between the control device and the peripheral element in the context of the switching functionality by the intermediate device, and
    locking out a write access to the buffer by the intermediate device so that the telegrams remain in original forms without amendments.

11. An intermediate device for transmitting telegrams between a control device and a peripheral element, comprising:
    a program memory that stores a computer program;
    a buffer that stores temporarily telegrams; and
    a microprocessor that executes the computer program for:
      receiving the telegrams by the intermediate device in a context of a switching functionality,
      temporarily storing the telegrams in the buffer,
      checking the telegrams for freedom from errors by the control device and the peripheral element,
      forwarding the telegrams at latest after a maximum buffer time without amendment between the control device and the peripheral element in the context of the switching functionality by the intermediate device, and
      locking out a write access to the buffer by the intermediate device so that the telegrams remain in original forms without amendments,
    wherein the intermediate device controls a movement of a numerically controlled machine within an automations system which controls a technical process and comprises peripheral elements including drives and input/output elements.

12. The intermediate device as claimed in claim 11, wherein the computer program is executed by an ASIC.

* * * * *